(12) United States Patent
Kschier et al.

(10) Patent No.: US 10,518,337 B2
(45) Date of Patent: Dec. 31, 2019

(54) MACHINE TOOL FOR MACHINING A WORKPIECE AND SPINDLE CARRIER ASSEMBLY FOR USE ON SUCH A MACHINE TOOL

(71) Applicant: DECKEL MAHO PFRONTEN GMBH, Pfronten (DE)

(72) Inventors: Uwe Kschier, Füssen (DE); Alfred Geissler, Pfronten (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 31 days.

(21) Appl. No.: 15/696,473

(22) Filed: Sep. 6, 2017

(65) Prior Publication Data

US 2018/0065192 A1    Mar. 8, 2018

(30) Foreign Application Priority Data

Sep. 6, 2016 (DE) .................. 10 2016 216 902

(51) Int. Cl.
  *B23C 1/12* (2006.01)
  *B23Q 1/54* (2006.01)
  *B23Q 3/157* (2006.01)

(52) U.S. Cl.
  CPC .............. *B23C 1/12* (2013.01); *B23Q 1/5412* (2013.01); *B23C 2226/27* (2013.01);
  (Continued)

(58) Field of Classification Search
  CPC . B23Q 3/15706; B23Q 1/5412; B23Q 1/5475
  See application file for complete search history.

(56) References Cited

U.S. PATENT DOCUMENTS 4,486,928 A * 12/1984 Tucker .................. B23Q 7/046
                                                             29/26 A
4,590,578 A *  5/1986 Barto, Jr. ................. B21J 15/10
                                                             318/632
(Continued)

FOREIGN PATENT DOCUMENTS

DE    10 2009 020 771 A1    11/2010
DE    20 2011 100 455 U1     5/2012
(Continued)

OTHER PUBLICATIONS

Feb. 1, 2018 European Search Report issued in European Patent Application No. 17189657.4.
(Continued)

*Primary Examiner* — Sunil K Singh
*Assistant Examiner* — Yasir A Diab
(74) *Attorney, Agent, or Firm* — Oliff PLC

(57) ABSTRACT

A machine tool includes a machine bed, a tool clamping portion which is arranged on the machine bed and serves to clamp a workpiece on the machine tool, a swivel arm receiving portion arranged on the machine bed, a first swivel arm pivotally mounted on the swivel arm receiving portion about a first axis of rotation, a second swivel arm pivotally mounted on the first swivel arm about a second axis of rotation, a spindle carrier arm rotatably mounted on the second swivel arm about a third axis of rotation, a milling head rotatably mounted on the spindle carrier arm about a fourth axis of rotation, and a work spindle which is held on the milling head and serves to receive a tool, wherein the third axis of rotation is aligned perpendicularly or transversely to the fourth axis of rotation.

23 Claims, 16 Drawing Sheets

(52) U.S. Cl.
CPC ...... *B23C 2270/14* (2013.01); *B23Q 3/15706* (2013.01); *Y10T 483/1795* (2015.01)

(56) References Cited

U.S. PATENT DOCUMENTS

| | | | | |
|---|---|---|---|---|
| 4,604,787 | A * | 8/1986 | Silvers, Jr. | B23Q 3/15526 29/26 A |
| 4,904,148 | A * | 2/1990 | Larsson | B25J 9/04 414/680 |
| 5,303,333 | A * | 4/1994 | Hoos | G05B 19/39 700/245 |
| 5,581,166 | A * | 12/1996 | Eismann | B25J 9/04 318/568.18 |
| 5,737,500 | A * | 4/1998 | Seraji | B25J 9/1643 318/568.11 |
| 5,781,705 | A * | 7/1998 | Endo | B25J 9/1643 318/568.22 |
| 6,674,189 | B2 * | 1/2004 | Watanabe | B23Q 11/0883 310/52 |
| 7,114,895 | B2 * | 10/2006 | Kojima | B23Q 11/127 409/135 |
| 8,442,686 | B2 * | 5/2013 | Saito | B25J 9/06 700/245 |
| 9,061,424 | B2 * | 6/2015 | Prat | B21J 15/14 |
| 9,080,827 | B2 * | 7/2015 | Franceschi | F41A 23/20 |
| 9,975,180 | B2 * | 5/2018 | Fujimoto | B23B 3/065 |
| 2004/0093119 | A1 * | 5/2004 | Gunnarsson | B25J 9/1638 700/245 |
| 2005/0095877 | A1 * | 5/2005 | Granger | G01B 5/008 439/11 |
| 2006/0048364 | A1 * | 3/2006 | Zhang | B23Q 17/0966 29/407.08 |
| 2006/0288550 | A1 * | 12/2006 | Johansson | B23K 20/1245 29/53 |
| 2006/0291970 | A1 * | 12/2006 | Granger | B23B 51/0413 409/137 |
| 2007/0087924 | A1 * | 4/2007 | Krosta | B23Q 3/1554 483/1 |
| 2009/0088899 | A1 * | 4/2009 | Johansson | B25J 13/085 700/258 |
| 2009/0199690 | A1 * | 8/2009 | Sun | B25J 9/1664 83/523 |
| 2010/0122614 | A1 * | 5/2010 | Waterman | B08B 9/0808 83/360 |
| 2010/0206040 | A1 * | 8/2010 | Ebara | G01B 21/042 73/1.79 |
| 2010/0319811 | A1 * | 12/2010 | Waterman | B08B 9/0808 147/1 |
| 2011/0015049 | A1 * | 1/2011 | Grob | B23Q 3/1554 483/37 |
| 2011/0140330 | A1 * | 6/2011 | Nishikawa | B23K 9/02 269/55 |
| 2011/0257786 | A1 * | 10/2011 | Caron L'Ecuyer | A61G 5/10 700/258 |
| 2013/0166071 | A1 * | 6/2013 | Kranz | B25J 9/1633 700/260 |
| 2013/0203572 | A1 * | 8/2013 | Denkmeier | B21D 5/0254 483/58 |
| 2015/0063932 | A1 * | 3/2015 | Zubin | B23B 39/20 408/1 R |
| 2015/0153149 | A1 * | 6/2015 | Pettersson | B25J 18/00 33/503 |
| 2015/0298343 | A1 | 10/2015 | Jung et al. | |
| 2017/0021505 | A1 | 1/2017 | Knoop et al. | |

FOREIGN PATENT DOCUMENTS

| | | |
|---|---|---|
| DE | 10 2010 064 271 A1 | 6/2012 |
| DE | 10 2014 206683 A1 | 10/2015 |
| DE | 10 2015 211 496 A1 | 12/2016 |
| EP | 2 631 040 A2 | 8/2013 |
| JP | S62-171565 A | 7/1987 |
| JP | S63-216644 A | 9/1988 |
| JP | S63-256385 A | 10/1988 |
| JP | H04-112794 U | 9/1992 |
| JP | H04-250911 A | 9/1992 |
| JP | H05-28564 U | 4/1993 |
| JP | 2001-260068 A | 9/2001 |
| JP | 2003-94267 A | 4/2003 |
| WO | 2015/123349 A2 | 8/2015 |
| WO | 2015/155005 A1 | 10/2015 |

OTHER PUBLICATIONS

Nov. 7, 2018 Office Action issued in Japanese Patent Application No. 2017-169391.

May 22, 2017 German Office Action issued in German Patent Application No. DE 10 2016 216 902.5.

* cited by examiner

MACHINE TOOL FOR MACHINING A WORKPIECE AND SPINDLE CARRIER ASSEMBLY FOR USE ON SUCH A MACHINE TOOL

The present invention relates to a machine tool for cutting or machining a workpiece and a spindle carrier assembly for use on such a machine tool.

BACKGROUND OF THE INVENTION

The prior art discloses machine tools having a tool-carrying work spindle. Said machine tools are nowadays usually provided with numeric controls and are known e.g. as milling machines, milling centers, universal milling machines or CNC machining centers having four, five or sometimes also more than five numerically controllable linear and/or rotational or swivel axes; see e.g. the machine tool according to DE 10 2010 064 271 A1.

Such machine tools having a tool-carrying work spindle have to be distinguished from machine tools having a workpiece-carrying work spindle, such as lathes, turning centers, double spindle lathes, multiple spindle lathes or multi-spindle automatic lathes.

The work spindle of such machine tools, in particular milling machines, milling centers, universal milling machines or CNC machining centers, is usually moved in different directions by means of a plurality of linear axes (e.g. travelling column milling machine). This is in particular suitable for processing cubic or approximately cubic workpieces.

It is a fundamental object in the machine tool building field, and also in particular an underlying object of the present invention, to provide a machine tool having a tool-carrying work spindle, in particular a machine tool for milling and/or drilling a workpiece, which functions accurately and reliably at the same time, with the shortest possible down times and which can also be provided in a cost-effective, compact and efficient way.

In particular the field of milling workpieces made of a composite material, in particular a carbon fiber-reinforced plastic material or CFK, calls for a more flexible and simultaneously accurate processing at high quantities. In order to process such components, in particular relatively large components, for which industrial robots cannot be used, a machine concept is required which renders possible a high processing motion flexibility with high degrees of freedom, high rigidity as well as high processing accuracy and efficiency.

Therefore, an object of the present invention is to provide or propose a machine tool which renders possible a machine kinematics providing highly rigid components and simultaneously a high motion flexibility with high degrees of freedom and a high processing accuracy and/or control precision, and also renders possible efficient, precise and simple workpiece processing, in particular for carrying out milling work on small and large workpieces made of a composite material, in particular a carbon fiber-reinforced plastic material or CFK, on freeform surfaces.

SUMMARY OF THE INVENTION

In order to achieve the above mentioned objects, the present invention proposes a machine tool according to claim 1 and a spindle carrier assembly according to claim 24. The dependent claims relate to preferred embodiments of the invention.

According to an aspect, a machine tool and/or machine tool for machining a workpiece is provided, comprising: a machine bed, a tool clamping portion which is arranged on the machine bed and serves to clamp a workpiece on the machine tool, a swivel arm receiving portion arranged on the machine bed, a first swivel arm pivotally mounted on the swivel arm receiving portion about a first axis of rotation, a second swivel arm pivotally mounted on the first swivel arm about a second axis of rotation, a spindle carrier arm rotatably mounted on the second swivel arm about a third axis of rotation, a milling head rotatably mounted on the spindle carrier arm about a fourth axis of rotation, and a work spindle held at the milling head and serving to receive a tool.

In particular, a machine tool or machine tool for machining a workpiece is provided, comprising a machine bed, a tool clamping portion which is arranged on the machine bed and serves to clamp a workpiece on the machine tool, and a spindle carrier assembly arranged on the machine bed, wherein the spindle carrier assembly preferably includes: a swivel arm receiving portion arranged on the machine bed, a first swivel arm pivotally mounted on the swivel arm receiving portion about a first axis of rotation, a second swivel arm pivotally mounted on the first swivel arm about a second axis of rotation, a spindle carrier arm rotatably mounted on the second swivel arm about a third axis of rotation, a milling head rotatably mounted on the spindle carrier arm about a fourth axis of rotation, and a work spindle held at the milling head and serving to receive a tool.

Therefore, this renders possible a freer movement with fewer components and a freer or less crowded processing area providing a greater freedom of movement in the working area at the degrees of freedom as a four-axis or five-axis milling machine of conventional design. At the same time, it is possible to provide highly rigid assemblies having high-precision drives and swivel and/or rotary axes so as to achieve the same or even better processing accuracies, as is the case in four-axis or five-axis milling machines of conventional design (travelling column milling machine).

In particular, the present invention makes it possible to create or provide a machine tool concept which has a machine kinematics providing highly rigid components and simultaneously a high motion flexibility with high degrees of freedom and which enables a high processing accuracy and/or control precision, and in addition renders possible efficient, accurate and simple workpiece processing, in particular for carrying out milling operations on small and large workpieces made of a composite material, in particular a carbon fiber-reinforced plastic material or CFK, on freeform surfaces.

In particular, this serves to provide a machine tool concept which while carrying out milling operations on workpieces made of a composite material, in particular a carbon fiber-reinforced plastic material or CFK, allows a more flexible and simultaneously accurate processing at high quantities. A machine tool concept is provided which renders possible a high processing motion flexibility at high degrees of freedom, high rigidity and high processing accuracy as well as efficiency.

In appropriate preferred embodiments, the third axis of rotation is aligned perpendicularly or transversely to the fourth axis of rotation. In appropriate preferred embodiments, the second axis of rotation is aligned in parallel to the first axis of rotation. In appropriate preferred embodiments, the third axis of rotation is aligned perpendicularly or transversely to the second axis of rotation. In appropriate preferred embodiments, a spindle axis of the work spindle is aligned perpendicularly or transversely to the fourth axis of rotation.

In appropriate preferred embodiments, the tool clamping portion is arranged relative to the swivel arm receiving portion on the machine bed so as to be linearly movable in at least one linear axis direction. In appropriate preferred embodiments, the swivel arm receiving portion is arranged on an axis slide which is linearly movable on the machine bed. In appropriate preferred embodiments, the axis slide is linearly movable in a direction parallel to the first axis of rotation.

It is thus possible to provide a freer movement with fewer components and a freer processing area providing a greater freedom of movement in the working area creating equal degrees of freedom as a five-axis milling machine of conventional design. At the same time, highly rigid assemblies with high-precision drives and swivel and/or rotary axes can be provided so as to obtain the same or even higher processing accuracies, as is the case in the five-axis milling machines of conventional design (travelling column milling machine).

In appropriate preferred embodiments, the swivel arm receiving portion has two swivel arm support bodies. The first swivel arm is preferably held so as to be pivotally mounted between the two swivel arm support bodies. This improves the rigidity of the structure and the accuracy achievable during processing.

In appropriate preferred embodiments, one of the swivel arm support bodies is smaller than the other swivel arm support body of the two swivel arm support bodies, wherein the second swivel arm is preferably held on the side of the first swivel arm that faces the smaller swivel arm support body. This improves the freedom of movement of the swivel motions, in particular of the two swivel arms.

In appropriate preferred embodiments, each of the two swivel arm support bodies of the swivel arm receiving portion has at least one drive for driving a swivel movement of the first swivel arm. This improves the rigidity of the structure, the uniformity of the swivel control and the accuracy achievable during processing.

In appropriate preferred embodiments, each of the two swivel arm support bodies of the swivel arm receiving portion has at least one clamped transmission for transmitting a torque when driving a swivel movement of the first swivel arm. This improves the uniformity of the swivel control and the accuracy achievable during processing.

In appropriate preferred embodiments, the first swivel arm has at least one drive for driving a swivel movement of the second swivel arm. In appropriate preferred embodiments, the first swivel arm has at least one clamped transmission for transmitting a torque when driving a swivel movement of the second swivel arm.

In appropriate preferred embodiments, each of the clamped transmissions has at least one driven drive element and at least two driving drive elements, which simultaneously work together with the driven actuating element. This improves the uniformity of the swivel control and the accuracy achievable during processing.

In appropriate preferred embodiments, the second swivel arm has at least one drive for driving the rotary motion of the spindle carrier arm. In useful preferred embodiments, the drive for driving the rotational movement of the spindle carrier arm is made as a torque drive, in particular cooled torque drive. This improves the uniformity of the rotational control and the accuracy achievable during processing.

In appropriate preferred embodiments, the spindle carrier arm has at least one drive for driving a rotary motion of the milling head. In appropriate preferred embodiments, the drive for driving the rotary motion of the milling head is made as a torque drive, in particular cooled torque drive. This improves the uniformity of the rotational control and the accuracy achievable during processing.

In appropriate preferred embodiments, the machine tool comprises a tool magazine for storing a plurality of tools in order to insert and/or exchange tools on the work spindle.

In appropriate preferred embodiments, a second spindle carrier assembly is arranged on the machine bed in addition to a first spindle carrier assembly which comprises the swivel arm receiving portion, the first swivel arm, the second swivel arm, the spindle carrier arm, the milling head and the work spindle.

In appropriate preferred embodiments, the second spindle carrier assembly comprises: a second swivel arm receiving portion arranged on the machine bed of the machine tool, a third swivel arm pivotally mounted on the second swivel arm receiving portion about a fifth axis of rotation, a fourth swivel arm pivotally mounted on the third swivel arm about a sixth axis of rotation, a second spindle carrier arm rotatably mounted on the fourth swivel arm about a seventh axis of rotation, a second milling head rotatably mounted on the second spindle carrier arm about an eighth axis of rotation and/or a second work spindle held on the second milling head for receiving a tool, wherein the seventh axis of rotation is preferably aligned perpendicularly or transversely to the eighth axis of rotation.

In appropriate preferred embodiments, the first, second, fifth and sixth axes of rotation are all aligned parallel to one another, wherein in particular the first and fifth axes of rotation are preferably aligned so as to be coaxial to each other.

In appropriate preferred embodiments, the first and second spindle carrier assemblies are arranged in the direction of the first and/or fifth axis of rotation side by side on the machine bed.

A further aspect proposes a spindle carrier assembly for use on a machine tool, comprising a swivel arm receiving portion that can be arranged or mounted on a machine bed of the machine tool, a first swivel arm which is pivotally mounted on the swivel arm receiving portion about a first axis of rotation, a second swivel arm which is pivotally mounted on the first swivel arm about a second axis of rotation, a spindle carrier arm which is rotatably mounted on the second swivel arm about a third axis of rotation, a milling head which is rotatably mounted on the spindle carrier arm about a fourth axis of rotation and/or a work spindle which is held on the milling head and serves to receive a tool, wherein the third axis of rotation is aligned perpendicularly or transversely to the fourth axis of rotation.

In summary, the present invention makes it possible to create and/or provide a machine tool, which has a machine kinematics with highly rigid components and at the same time makes possible a high motion flexibility providing high degrees of freedom and a high processing accuracy and/or control precision, and in addition renders possible efficient, accurate and simple workpiece processing, in particular for carrying out milling operations on small and large workpieces made of a composite material, in particular a carbon fiber-reinforced plastic material or CFK, on freeform surfaces.

In particular, it is thus possible to provide a machine tool which renders possible more flexible and at the same time accurate processing operations at high quantities when milling operations are carried out on workpieces made of a composite material, in particular a carbon fiber-reinforced plastic material or CFK. A machine concept is provided which renders possible a high processing motion flexibility and high degrees of freedom, high rigidity and high processing accuracy as well as efficiency.

Further aspects and the advantages thereof as well as also advantages and more specific design possibilities of the above described aspects and features are described in the following descriptions and explanations on the attached drawings, which should, however, by no means considered to be limiting.

DETAILED DESCRIPTION OF THE DRAWINGS AND PREFERRED EMBODIMENTS

Figure 1:
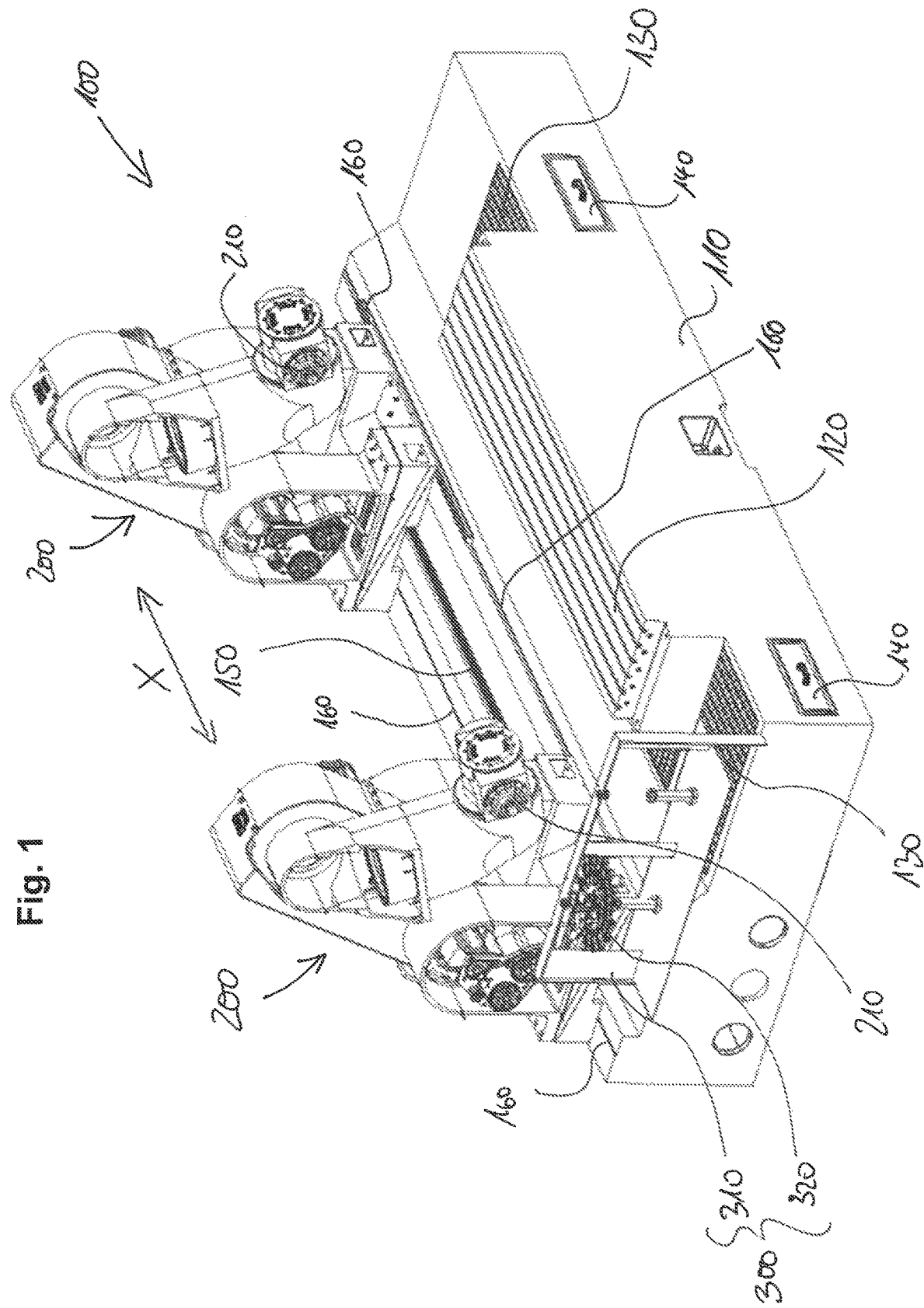
FIG. 1 shows an exemplary perspective view of a machine tool according to an embodiment of the invention, said view originating from the top left-hand front and being at an angle.
Figure 2:
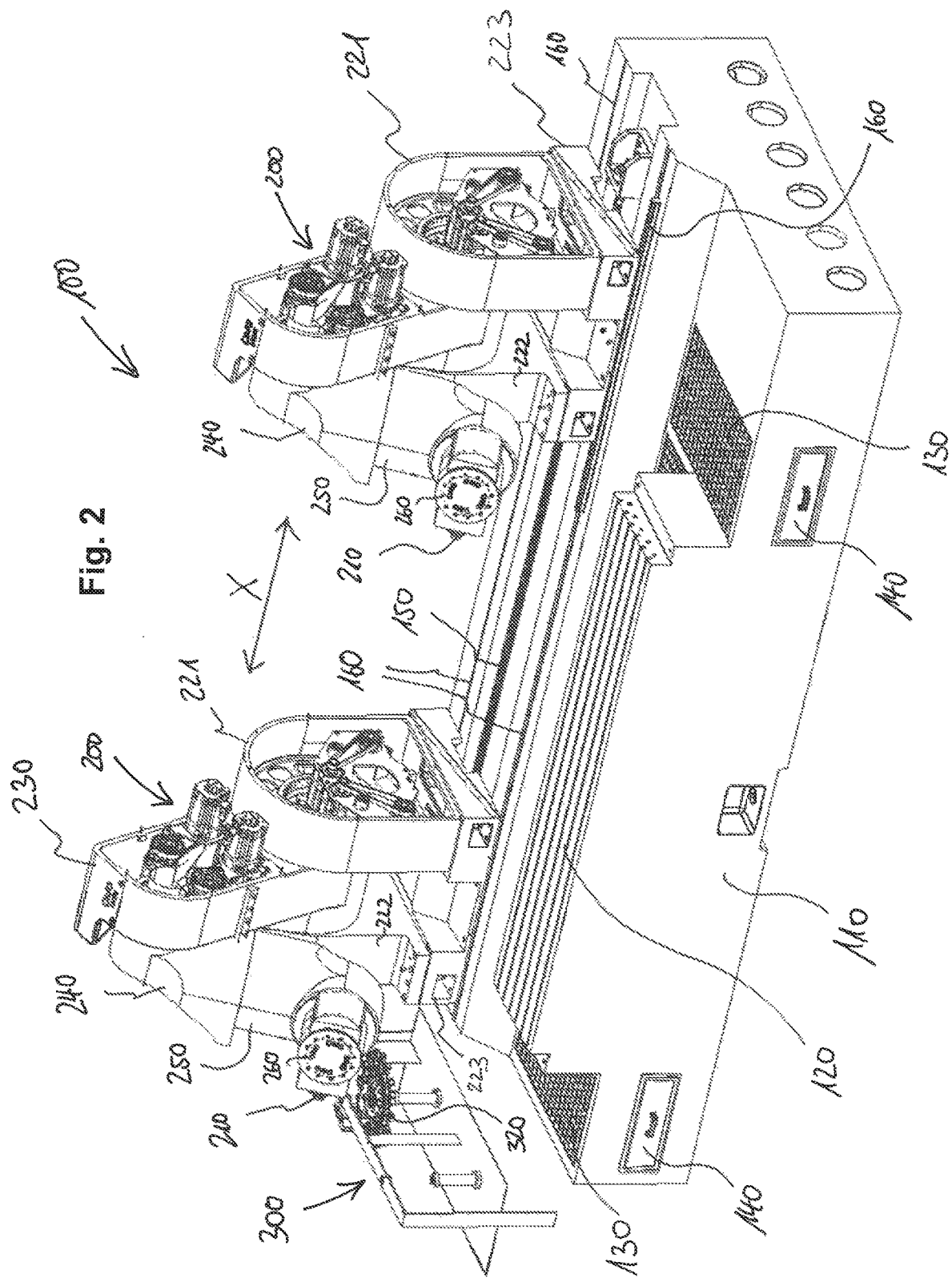
FIG. 2 shows a further exemplary perspective view of the machine tool according to FIG. 1, said view originating from the top right-hand front and being at an angle.
Figure 3:
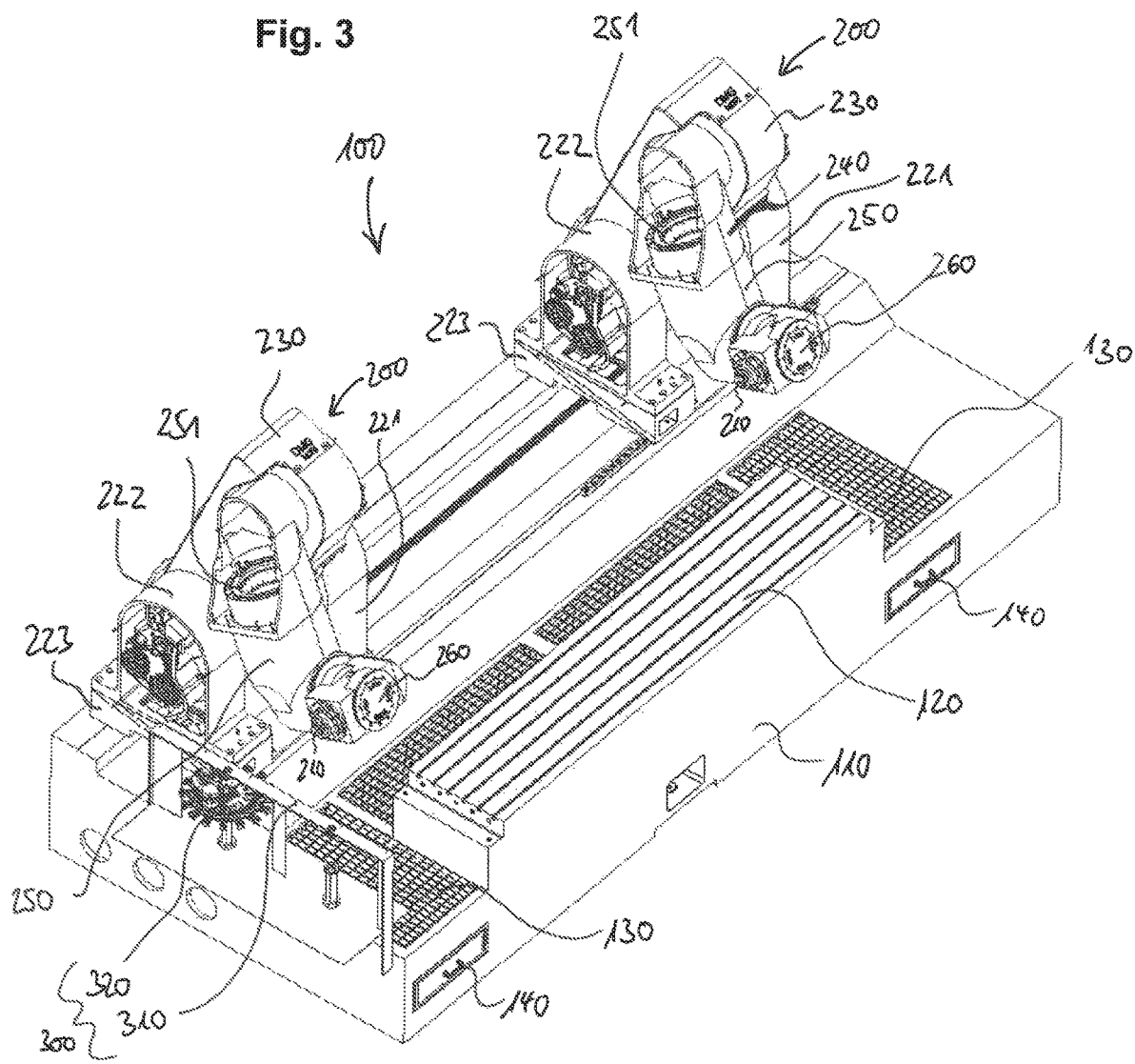
FIG. 3 shows a further exemplary perspective view of the machine tool according to FIG. 1, said view originating from the top left-hand front and being at an angle.
Figure 4:
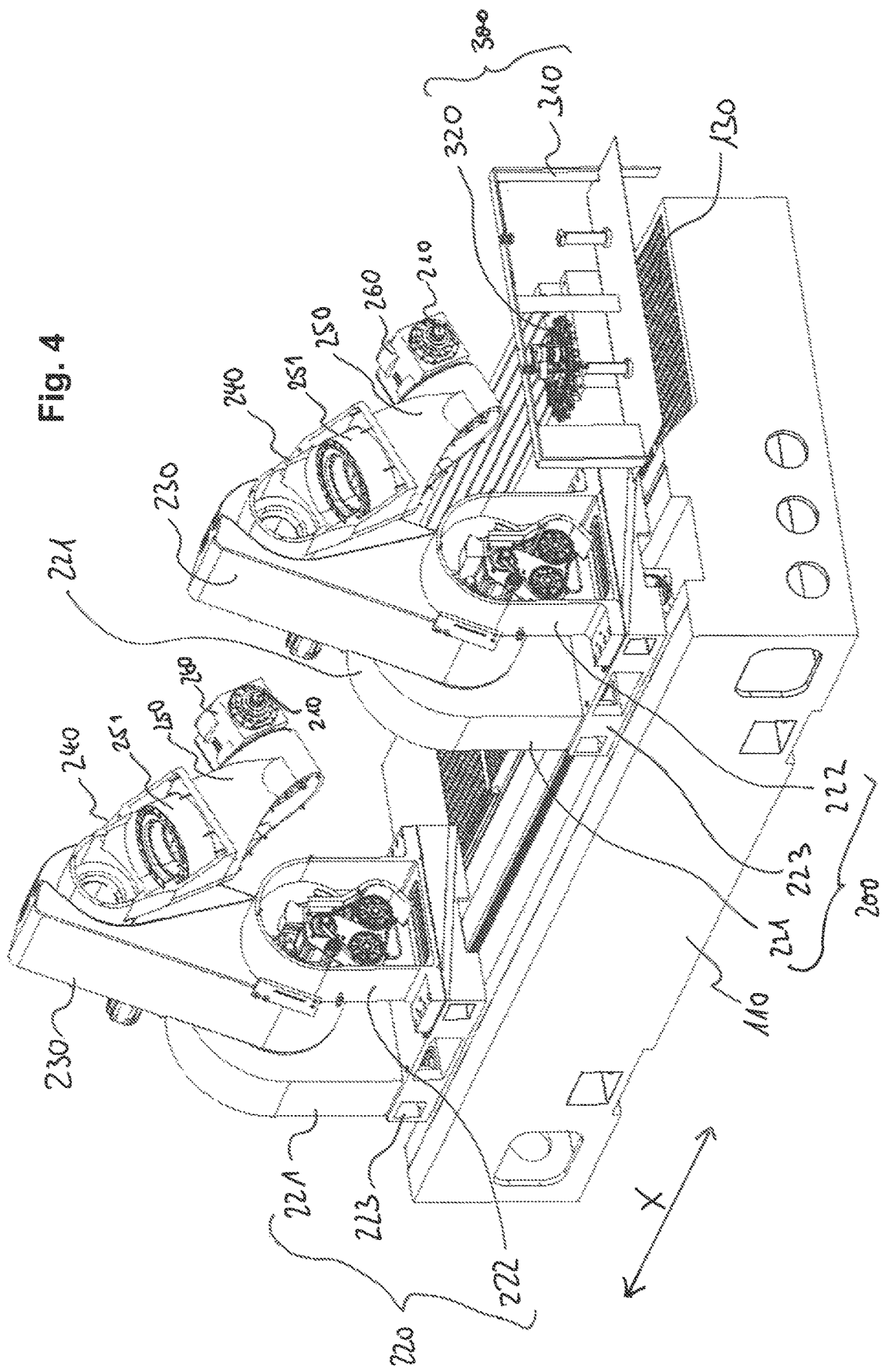
FIG. 4 shows a further exemplary perspective view of the machine tool according to FIG. 1, said view originating from the top left-hand rear and being at an angle.

Examples and embodiments of the present invention are described in detail below with reference to the enclosed drawings. The same or similar elements in the drawings can here be designated by the same reference signs and sometimes also by different reference signs.

However, it should be noted that the present invention is by no means limited or confined to the below described embodiments and the design features thereof but comprises further modifications of the embodiments, in particular those included by modifications of the features of the described examples and/or by combination of one or more features of the described examples on the basis of the scope of protection of the independent claims.

FIG. 1 shows an exemplary perspective view of a machine tool 100 according to an embodiment of the invention, said view originating from the top left-hand front and being at an angle.

The machine tool 100 has a machine bed 110 (machine column), which can be set up on a surface or floor of e.g. a factory workshop. In addition to the illustrated components, the machine tool 100 can additionally include further components, such as a machine housing having one or more doors which can be opened towards the machine and/or processing area, one or more control panels for operating the machine tool by an operator, a workpiece and/or pallet change apparatus, an attached relatively large tool magazine with change and/or handing apparatus and other machine tool components or accessory parts.

The machine tool 100 additionally has a workpiece clamping region 120 (tool clamping table), on which one or more workpieces can be clamped in order to be processed on the machine tool. This embodiment provides e.g. a simple workpiece region 120 made as a tool table. However, in further embodiments, it is possible to provide one or more rotary and/or swiveling tables, on which the workpiece can be clamped and controlled so as to be rotatable or pivotable about one, two or even three axes of rotation. It is also possible to arrange one or more tool tables (without or with one or more rotary and/or swiveling tables) on one or more linear axis slides which can be arranged on the machine bed in a linearly movable fashion.

In this embodiment, the workpiece clamping region 120 is made as a simple tool table which is arranged on an upper side of the machine frame 110. Around the tool clamping region 120, the machine frame 110 has cavities which, on the top side, are covered e.g. with grid portions 130. Chips accumulating when the workpiece clamped on the workpiece clamping region 120 is machined can therefore fall through the grid portions 130 into respective chip containers 140 in the cavities of the machine frame 110 where they are collected. The chip containers 140 can be withdrawn like a drawer in order to remove the chips. In further embodiments, it is possible to introduce automatic chip conveying devices into the cavities of the machine frame below the grid portions 130.

A rear side of the machine frame 110 of the machine tool 100 accommodates e.g. two spindle carrier assemblies 200 with a respective tool-carrying work spindle 210. The work spindles 210 are each configured to receive a particular tool, in particular milling cutter, and to rotationally drive the respective spindle axis in order to produce a cutting movement.

In addition, each of the spindle carrier assemblies 200 is arranged on the machine frame 110 so as to be linearly movable e.g. on linear guides 160. The spindle carrier assemblies 200 can be moved parallel to the workpiece clamping region 120 e.g. independently of one another on the machine frame 110 along the linear guideways 160 in a direction of the X-axis (X-direction), in particular to render possible a linear relative movement of the tools received on the work spindles 210 relative to one and/or more workpieces clamped on the workpiece clamping region 120.

For this purpose, e.g. a threaded shaft 150 is arranged on the machine frame 110 in the X-direction parallel to the linear guides 160, in which shaft respective counternut elements (not shown) engage on the bottom sides of the spindle carrier assemblies 200 and, as a result of the independent rotational driving thereof, the spindle carrier assemblies 200 are independently moved along the thread shaft 150 on the linear guideways 160.

Furthermore, one side of the machine frame 110 provides e.g. a tool magazine wheel 320 of a tool magazine 300, which can be mounted on the machine frame 110 by means of a magazine frame 310. The tool magazine wheel 320 is e.g. aligned horizontally and is held so as to be rotatable about a vertical axis of rotation. Along the circumference of the tool magazine wheel 320, the tool magazine wheel 320 has a plurality of tool receiving portions where tools can be held and/or received.

For a tool change, the left-hand spindle carrier assembly 200 in FIG. 1 is configured to move on the linear guideways 160 to the left to the tool magazine wheel 320 and to place a tool received in the work spindle 210 in a tool support of the of the tool magazine wheel 320 and/or to remove a tool to be inserted from a tool support of the tool magazine wheel 320 and receive it in the work spindle 210 to continue the processing operation of the workpiece by the inserted tool. The tool magazine wheel 320 is configured during, before and after the tool change to rotate the tool support(s) facing the spindle carrier assembly 200 by rotation.

Here, FIG. 1 only shows, by way of example, a small tool magazine 300 having a small tool magazine wheel 320 on a side of the machine frame 100. In addition, a tool magazine 300 can also be provided on the other side of the machine frame 100 for the other spindle carrier assembly 200. Furthermore, tool magazines having a plurality of tool magazine wheels 320 can also be provided on both sides next to each other and/or at a distance on top of one another.

In addition, larger supply tool magazines can be provided which insert and exchange available tools at the one or more tool magazine wheels 320 from a larger tool magazine.

FIGS. 2 to 5 shows further exemplary perspective views of the machine tool 100 according to FIG. 1. In particular, FIGS. 2 to 5 show further diagrams of the spindle carrier assemblies 200 arranged on the machine frame 110.

As an example, the spindle carrier assemblies 200 have the same design, and only one of the spindle carrier assemblies 200 is described as an example.

However, in further embodiments the spindle carrier assemblies can also be provided with different designs. In further embodiments, only one or more than two spindle carrier assemblies can be provided.

The spindle carrier assembly 200 has a swivel arm receiving portion 220 which has two swivel arm support bodies 221 and 222, which are both arranged on a linear axis slide 223.

The linear axis slide 223 is mounted on the linear guideways 160 so as to be linearly movable in the X-direction. The swivel arm support bodies 221 and 222 are arranged next to one another on the linear axis slide 223 in the X-direction.

One end of a first swivel arm 230 is pivotally held between the swivel arm support bodies 221 and 222. Drives are described below in connection with FIGS. 6 and 7.

The other end of the first swivel arm 230 holds a further second swivel arm 240, and the second swivel arm 240 is pivotally mounted on the first swivel arm 230. Drives are described below in connection with FIGS. 6 and 7.

The other end of the second swivel arm 240 holds a spindle carrier arm 250, which is rotatably mounted on the second swivel arm 240. The second swivel arm 240 here carries the drive 251 for driving the rotary motion of the spindle carrier arm 250. The drive 251 is made e.g. as a cooled torque drive.

The other end of the spindle carrier arm 250 holds a milling head 260, which is rotatably mounted on the spindle carrier arm 250. The spindle carrier arm 250 here carries a drive 261 for driving the rotary motion of the milling cutter 260 (see FIG. 14). The drive 261 is formed e.g. as a cooled torque drive.

The milling cutter 260 comprises the already described work spindle 210 and a spindle drive (not shown) for driving the work spindle for the rotational driving of the received tool in order to produce the cutting motion.

Figure 6:
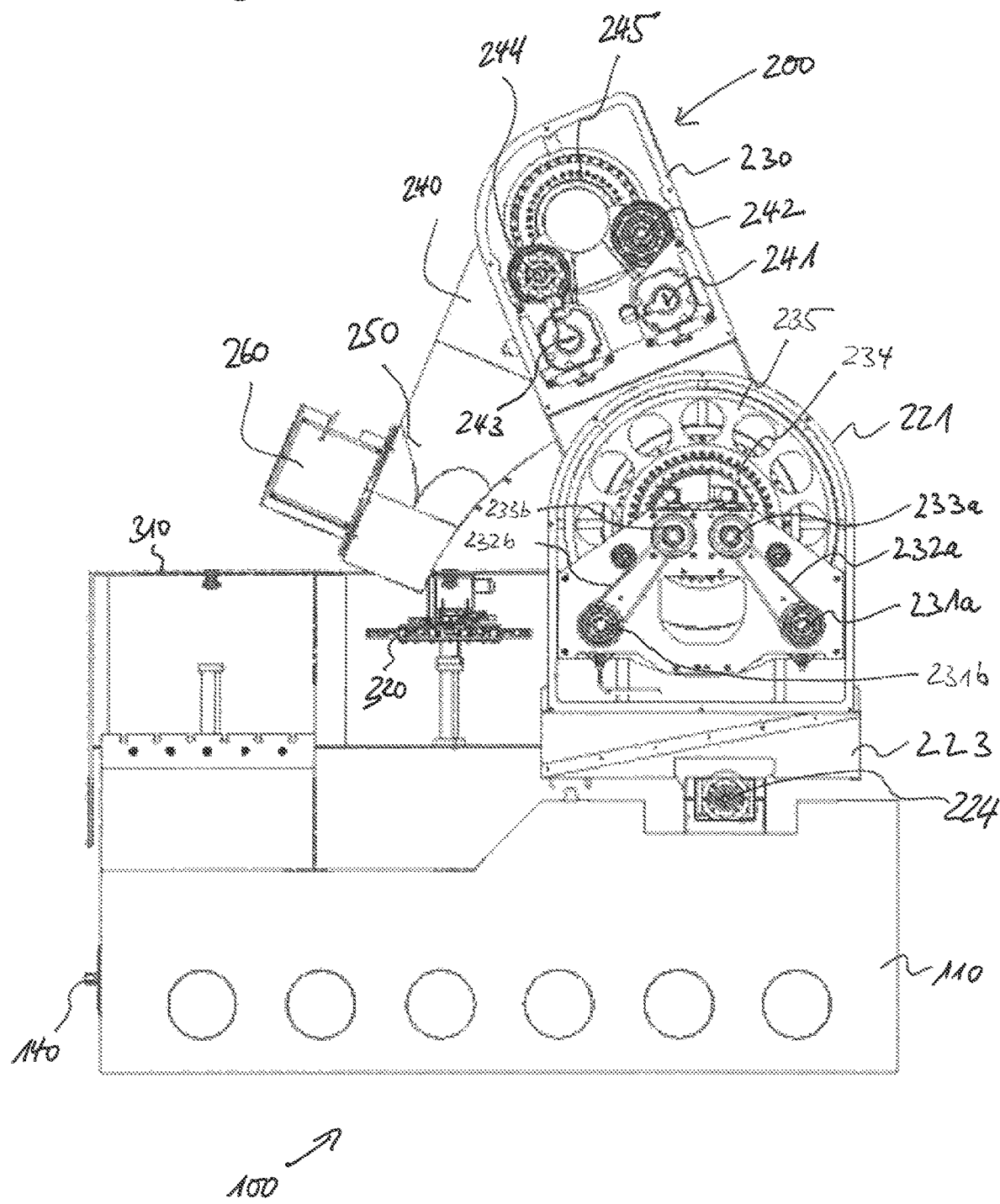
FIG. 6 shows an exemplary right-hand side view of the machine tool according to FIG. 1.
Figure 7:
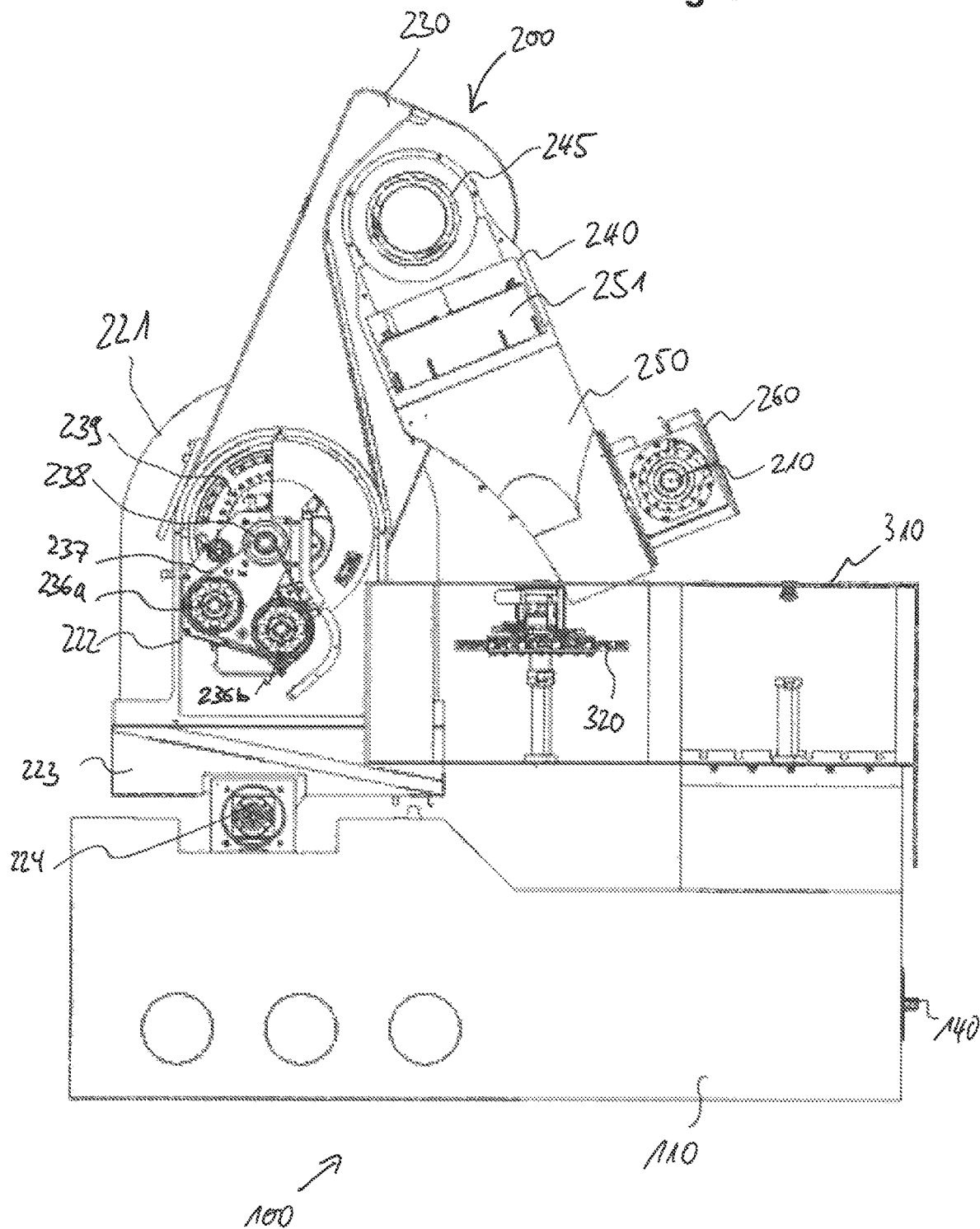
FIG. 7 shows an exemplary left-hand side view of the machine tool according to FIG. 1.

FIGS. 6 and 7 show side views of the machine tool 100 according to FIG. 1. In particular, FIGS. 6 and 7 show further diagrams of the spindle carrier assemblies 200 arranged on the machine frame 110.

An end of the first swivel arm 230 is pivotally held between the swivel arm support bodies 221 and 222. This embodiment equips each of the two swivel arm support bodies 221 and 222 with drives and transmissions for driving the swivel movement of the first swivel arm 230.

As shown in FIG. 6 by way of example, the swivel arm support body 221 has e.g. two drives 233a and 233b, which drive e.g., via respective driving belts 232a and 232b respective driving pinions 231a and 231b (driving drive elements) of a transmission in order to transmit a torque to the first swivel arm 230. The driving pinions 231a and 231b mesh with a driven gearwheel 235 (e.g. made as a spur gear) as an exemplary driven drive element in clamped fashion. The driven gearwheel 235 is non-rotatably mounted on the first swivel arm 230 e.g. via a bearing ring 234, said swivel arm being rotatably mounted on the swivel arm support body 221.

The clamped engagement of the two driving pinions 231a and 231b in the driven gearwheel 235 has the advantage that during a transition from driving counterclockwise and then clockwise or vice versa there is no clearance in the intermediate spaces of the teeth and a clearance-free and precise transition is rendered possible during the controlling operation, first counterclockwise and then clockwise or vice versa. This allows the swivel movement of the first swivel arm 230 to be controlled with excellent precision.

As shown in FIG. 7 by way of example, the swivel arm support body 222 has e.g. a drive 238 which drives e.g. via the driving belt 237 two driving pinions 236a and 236b (driving drive elements) of a transmission in order to transmit a torque to the first swivel arm 230. The driving pinions 236a and 236b mesh in clamped fashion with a driven gearwheel 239 (e.g. made as a spur wheel) as an exemplary driven drive element. The driven gearwheel 239 is e.g. non-rotatably mounted on the first swivel arm 230, which is rotatably mounted on the swivel arm support body 222.

The clamped engagement of the two driving pinions 236a and 236b in the driven gearwheel 230 has the advantage that during a transition from driving counterclockwise and then clockwise or vice versa there is no clearance in the intermediate spaces of the teeth and a clearance-free and precise transition is rendered possible during the controlling operation, first counterclockwise and then clockwise or vice versa. This renders possible an excellent precision of the control of the swivel movement of the first swivel arm 230.

The other end of the first swivel arm 230 holds the further second swivel arm 240, and the second swivel arm 240 is pivotally mounted on the first swivel arm 230.

As shown in FIG. 6 by way of example, the first swivel arm 230 has e.g. two drives 241 and 243, each driving e.g. via driving belts respective driving pinions 242 and 244 (driving drive elements) of a transmission in order to transmit a torque to the second swivel arm 240. The driving pinions 242 and 244 mesh with a driven gearwheel 245 (e.g. made as a ring gear) as an exemplary driven drive element in clamped fashion. The driven gearwheel 245 is e.g. non-rotatably mounted on the second swivel arm 240, which is rotatably mounted to the first swivel arm 230.

The clamped engagement of the two driving pinions 242 and 244 on the driven gearwheel 245 has the advantage that during a transition of driving counterclockwise and then clockwise or vice versa there is no clearance in the intermediate spaces of the teeth and a clearance-free and precise transition is rendered possible during the controlling operation, first counterclockwise and then clockwise or vice versa. This renders possible an excellent precision of the control of the swivel movement of the second swivel arm 240.

The other end of the second swivel arm 240 holds the spindle carrier arm 250, which is rotatably mounted on the second swivel arm 240. The second swivel arm 240 here carries the drive 251 for driving the rotary motion of the spindle carrier arm 250 (see e.g. FIG. 7). The drive 251 is made e.g. as a cooled torque drive.

The other end of the spindle carrier arm 250 holds the milling head 260, which is rotatably mounted on the spindle carrier arm 250. The spindle carrier arm 250 here carries the drive 261 for driving the rotary motion of the milling head 260 (see e.g. FIG. 14). The drive 261 is made e.g. as a cooled torque drive.

The milling head 260 comprises the above described work spindle 210 and a spindle drive (not shown) for driving the work spindle for the rotational driving of the accommodated tool in order to produce the cutting movement.

FIGS. 6 and 7 also show that the bottom sides of the spindle carrier slides 223 have e.g. drives 224, which mesh with the driven threaded nut elements (not shown) at the threaded shaft 150 and can show the linear movement of the spindle carrier slides 223 in the X-direction.

Figure 5:
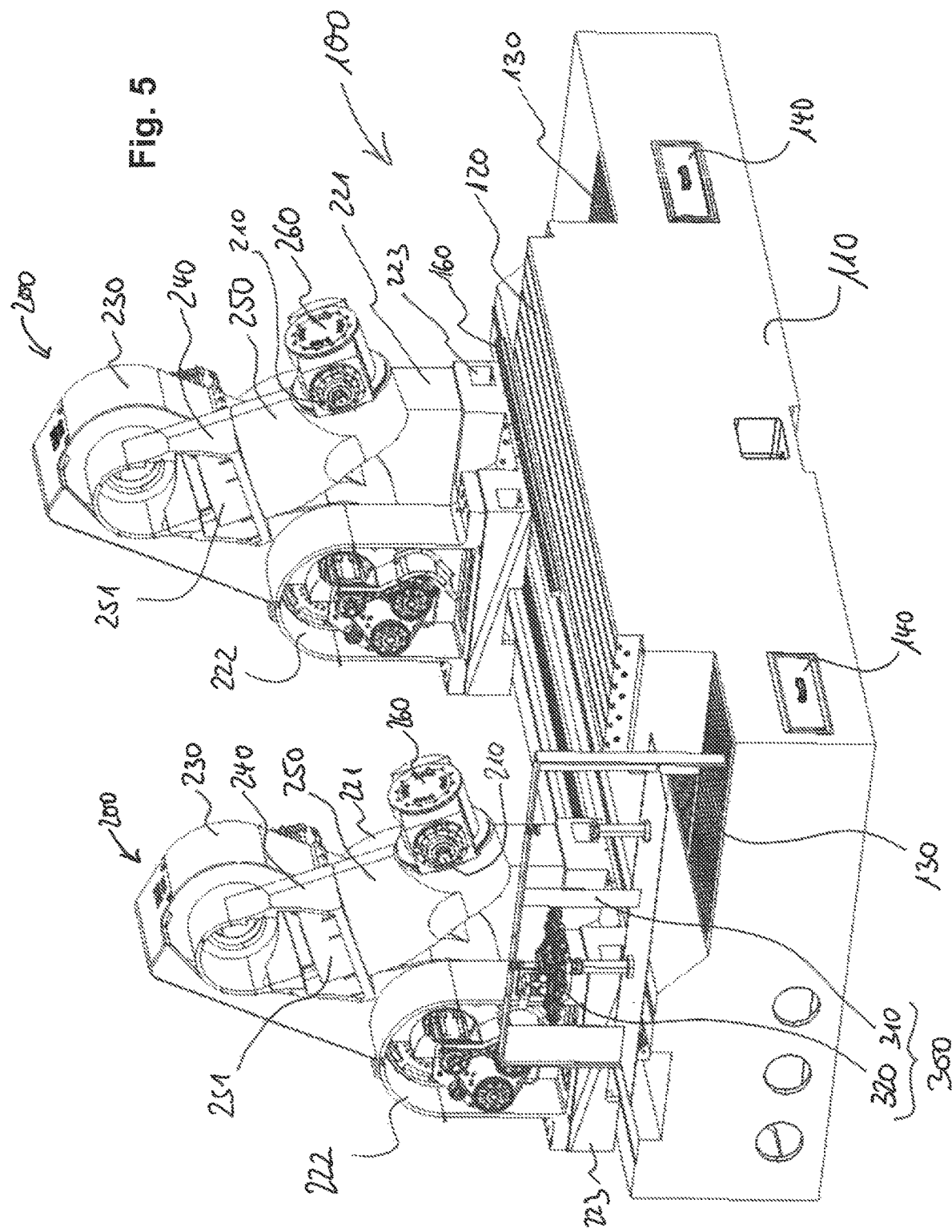
FIG. 5 shows a further exemplary perspective view of the machine tool according to claim 1, said view originating from the top left-hand front and being at an angle.
Figure 8:
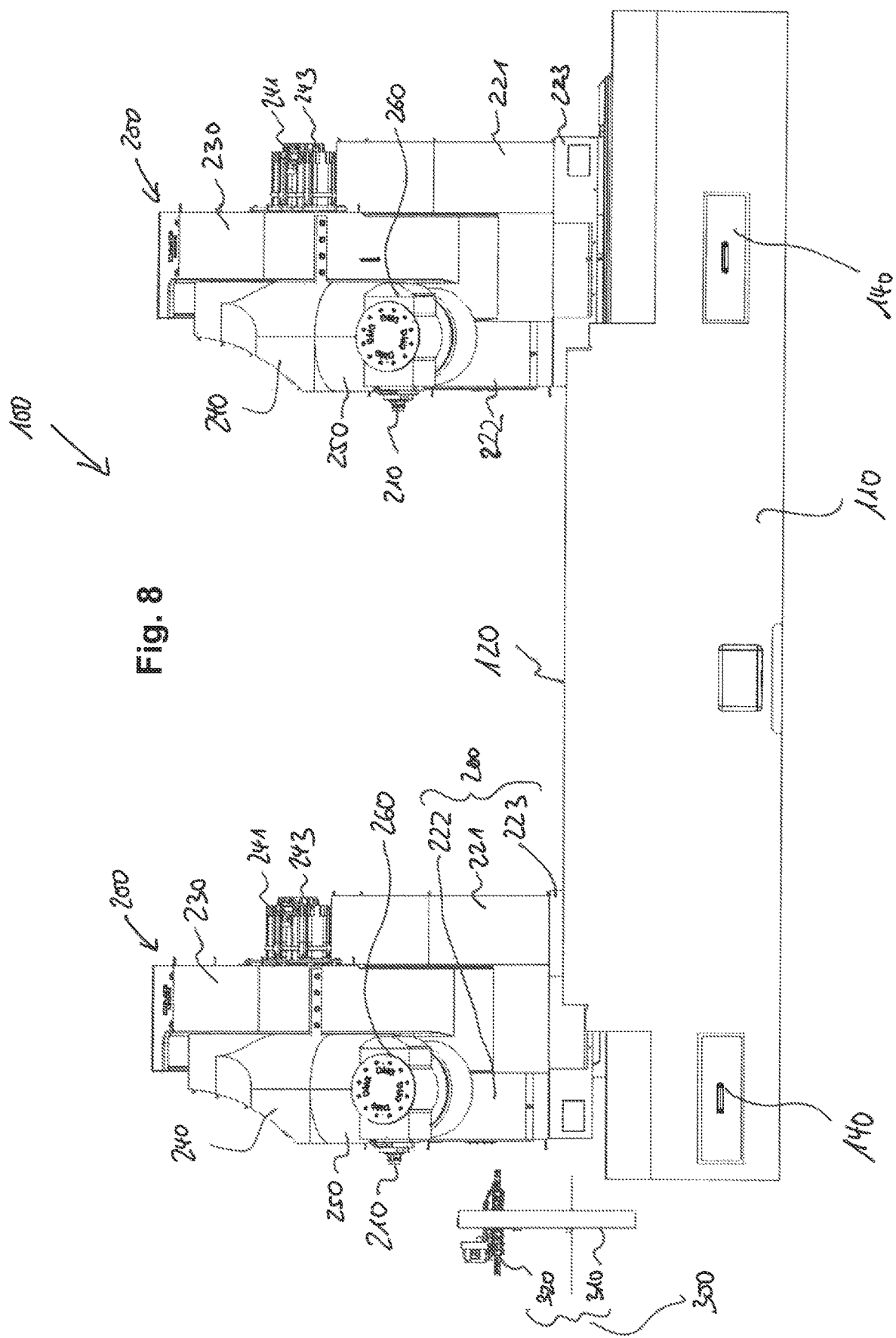
FIG. 8 shows an exemplary front view of the machine tool according to FIG. 1.
Figure 9:
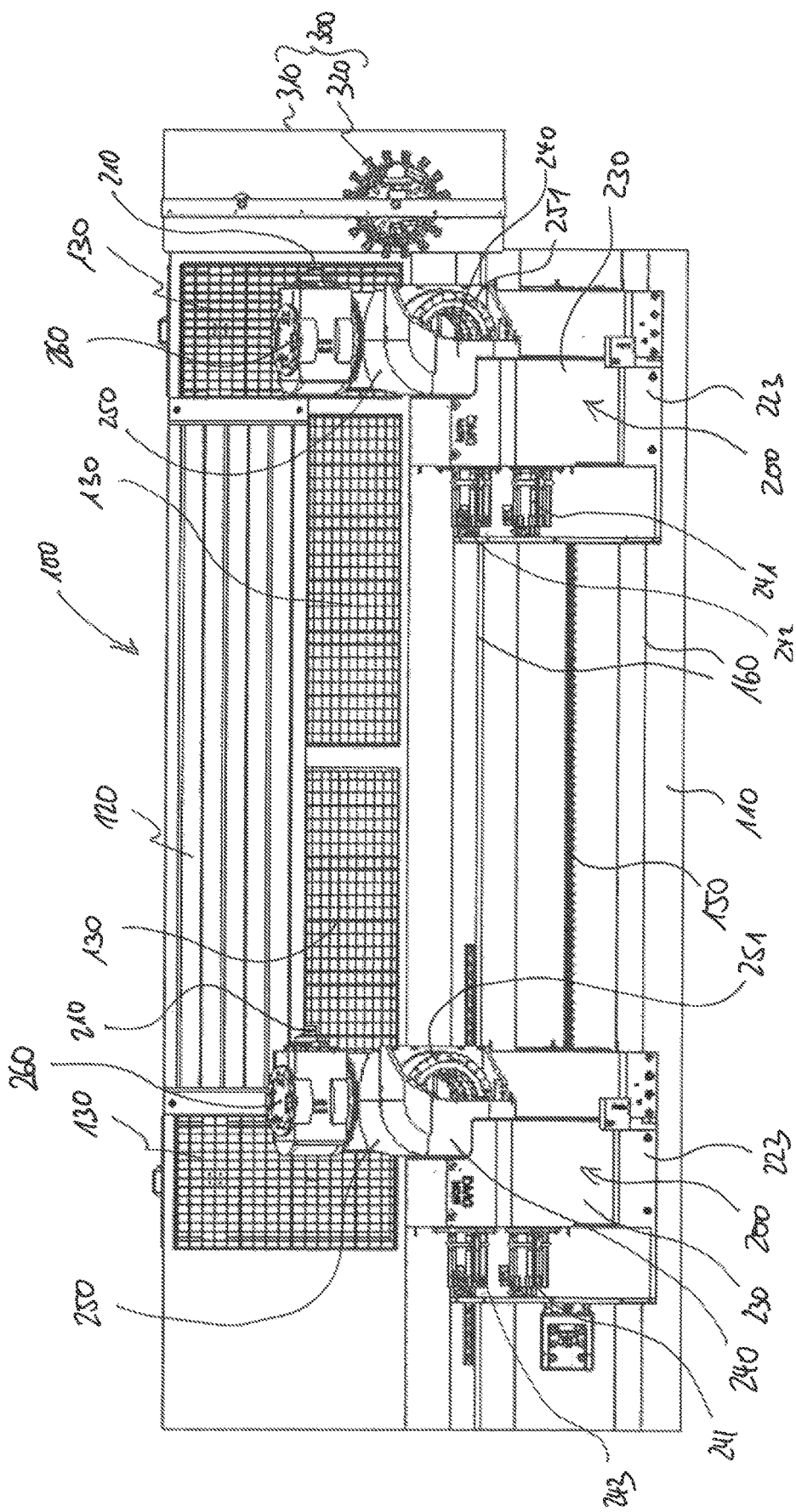
FIG. 9 shows an exemplary top view of the machine tool according to FIG. 1.
Figure 10:
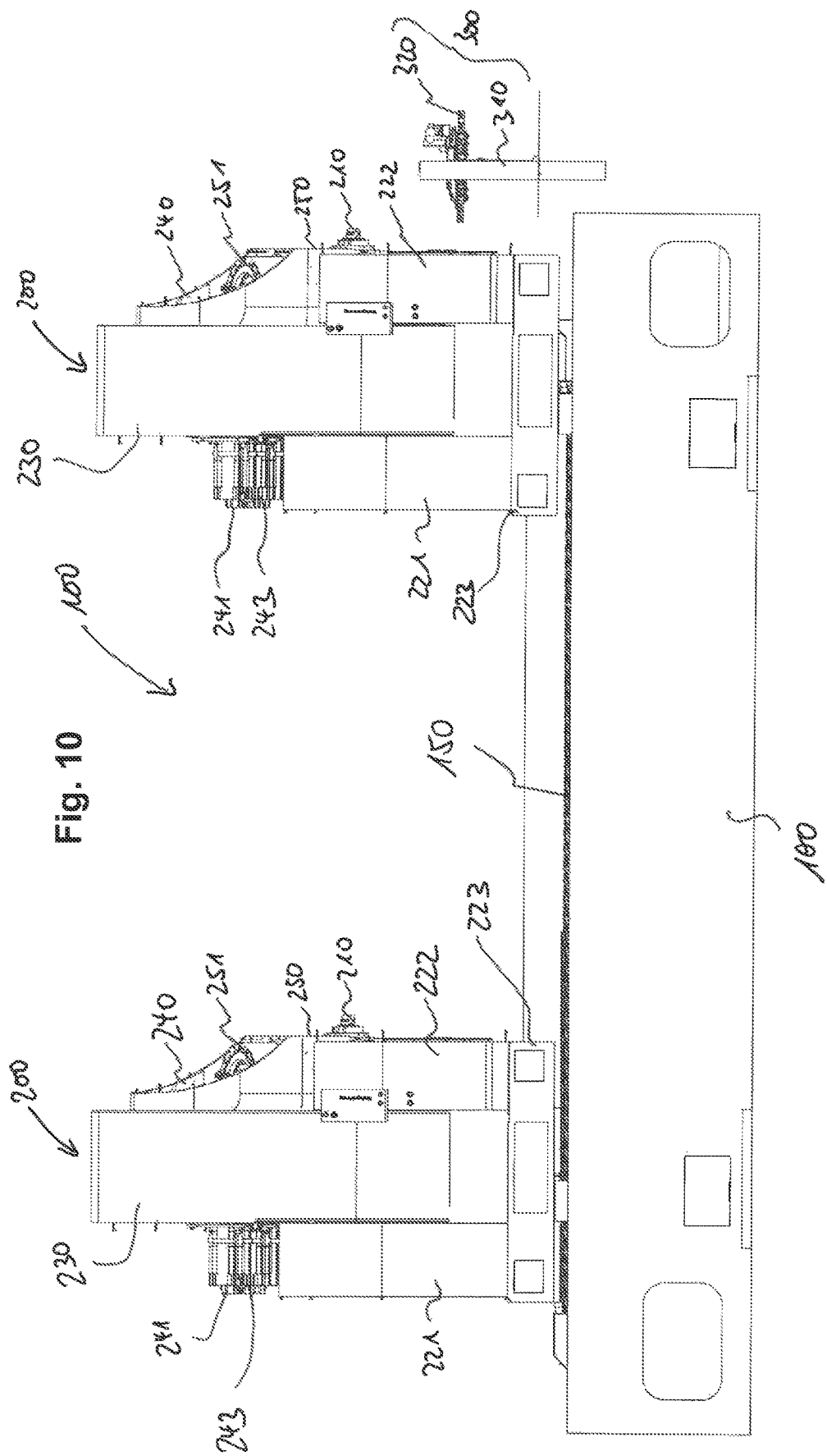
FIG. 10 shows an exemplary rear view of the machine tool according to FIG. 1.

FIG. 5 shows a further exemplary perspective view of the machine tool according to FIG. 1, said view originating from the top left-hand front and being at an angle, FIG. 6 shows an exemplary right-hand side view of the machine tool according to FIG. 1, FIG. 7 shows an exemplary left-hand side view of the machine tool according to FIG. 1, FIG. 8 shows an exemplary front view of the machine tool according to FIG. 1, FIG. 9 shows an exemplary top view of the machine tool according to FIG. 1, and FIG. 10 shows an exemplary rear view of the machine tool according to FIG. 1.

Figure 11:
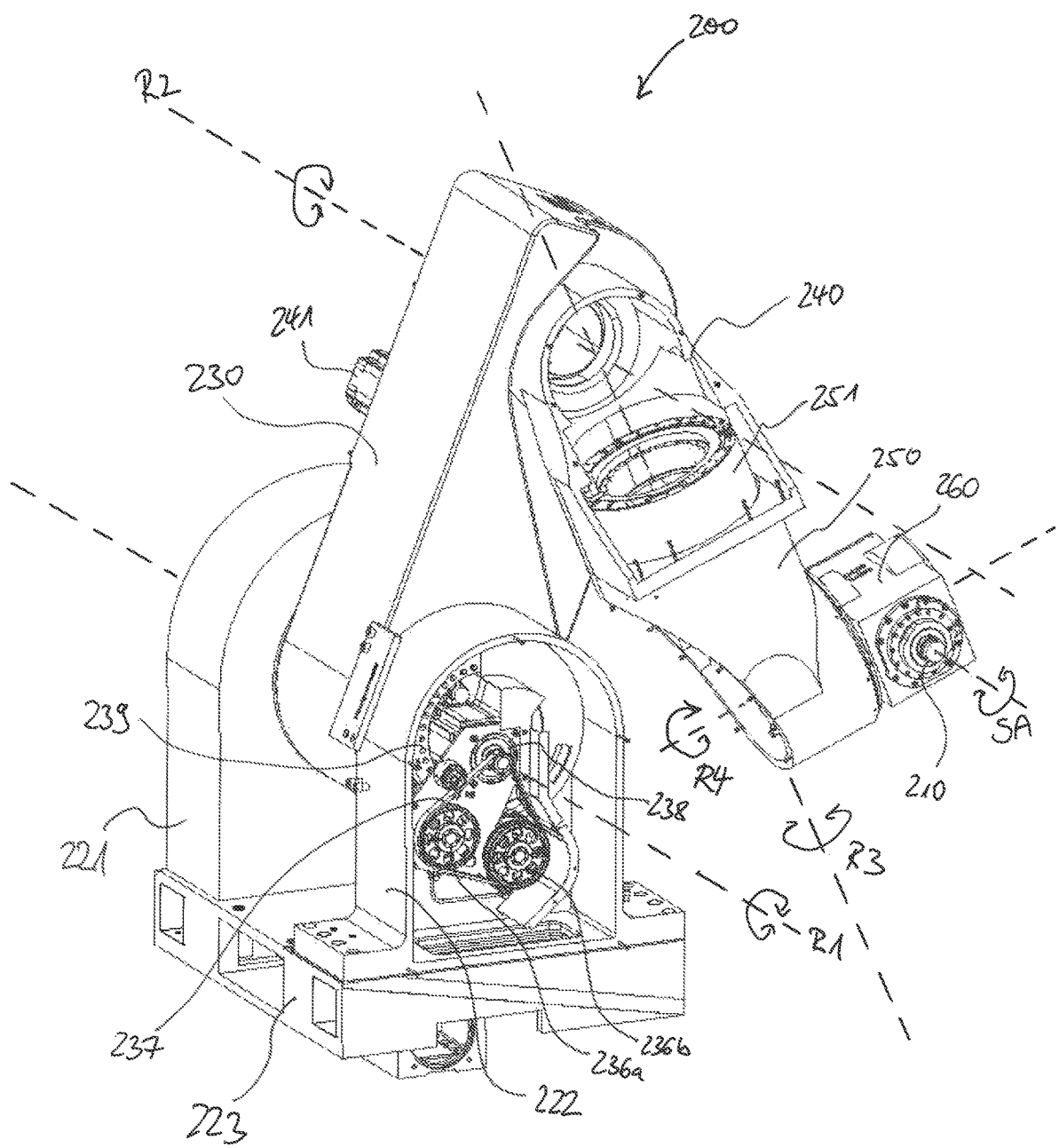
FIG. 11 shows an exemplary perspective view of a spindle carrier assembly of a machine tool according to an embodiment of the invention.
Figure 12:
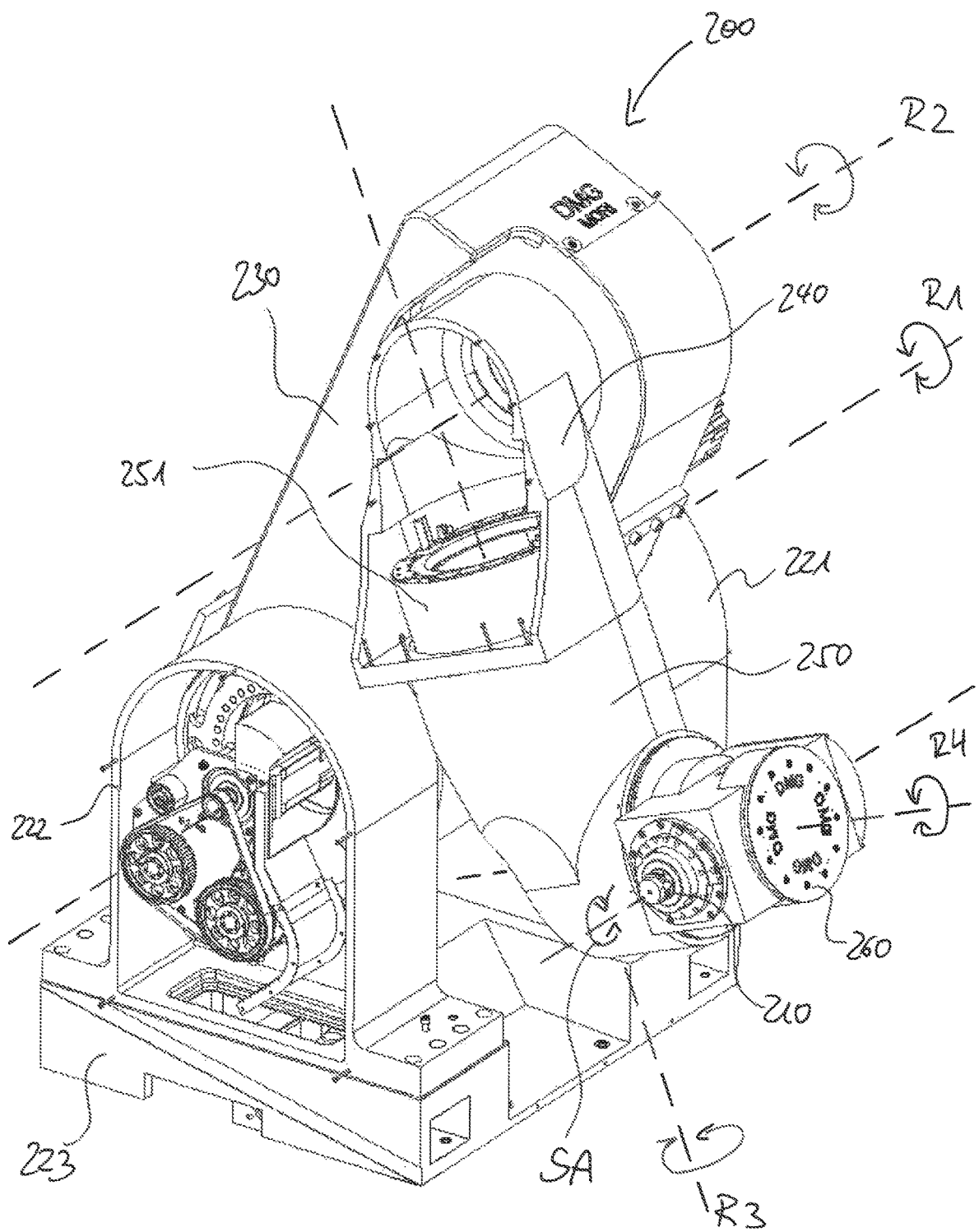
FIGS. 12 to 14 show further perspective views of a spindle carrier assembly according to FIG. 11.
Figure 13:
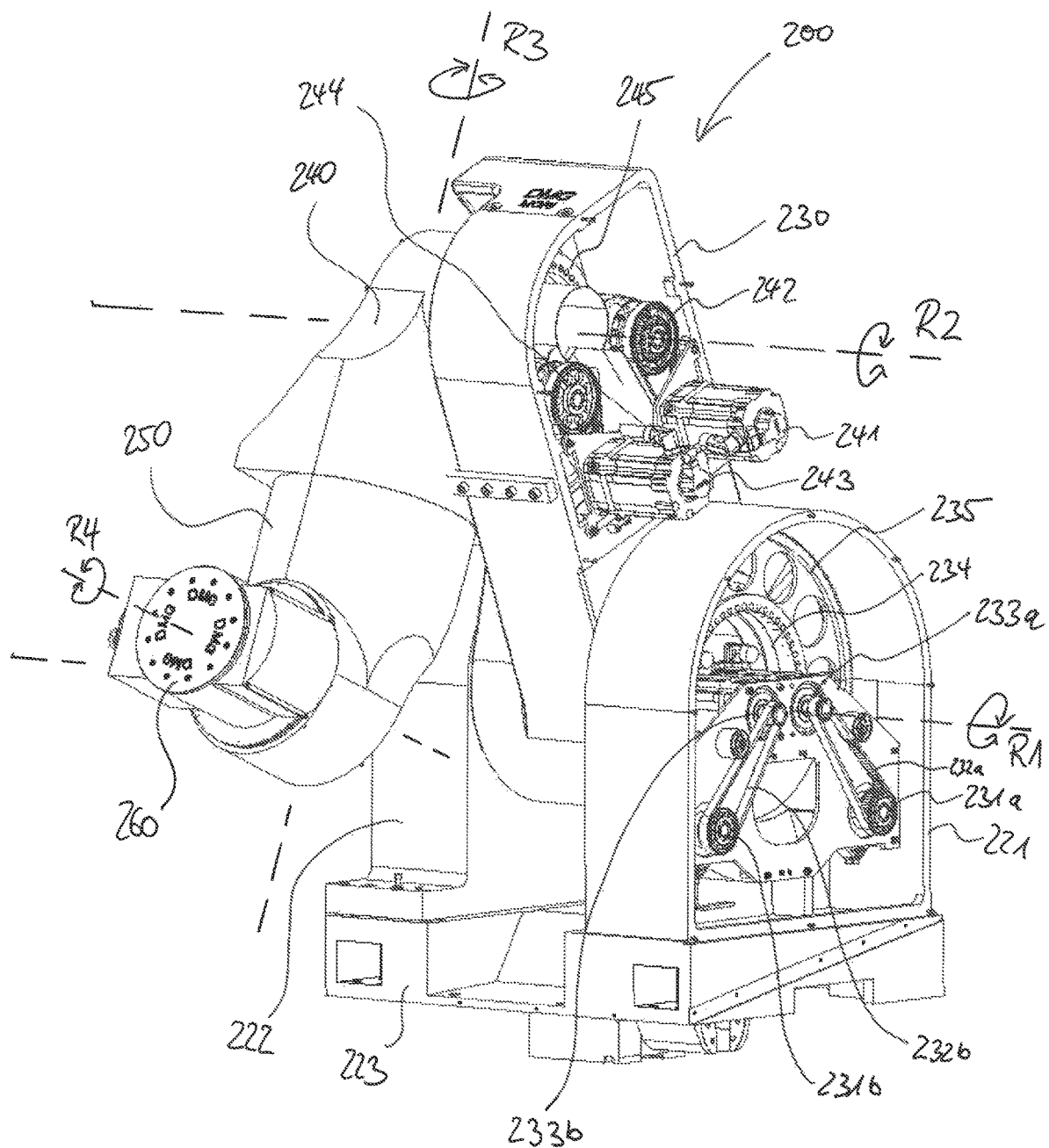
Figure 14:
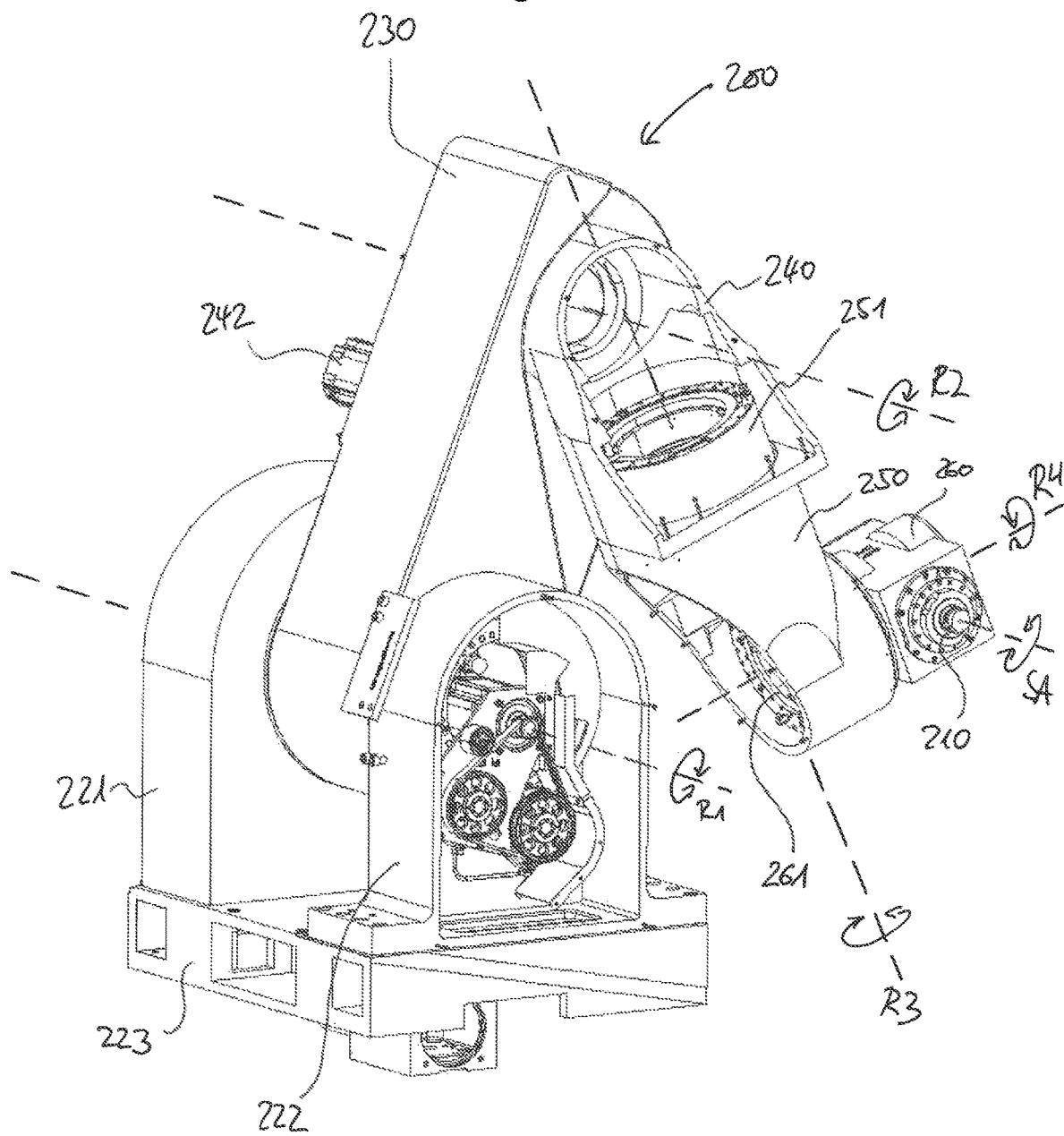
Figure 15:
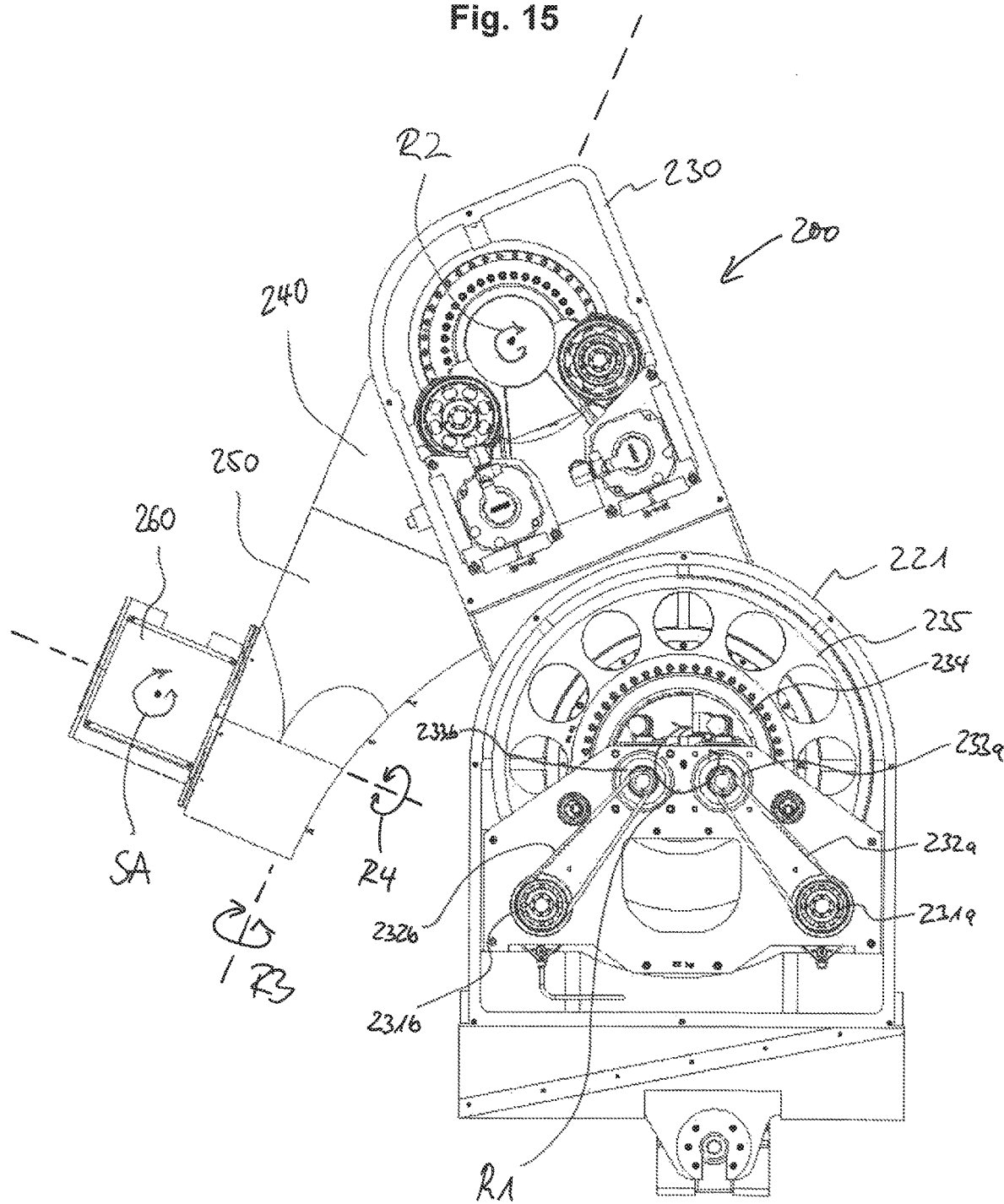
FIG. 15 shows an exemplary right-hand side view of the spindle carrier assembly according to FIG. 11.
Figure 16:
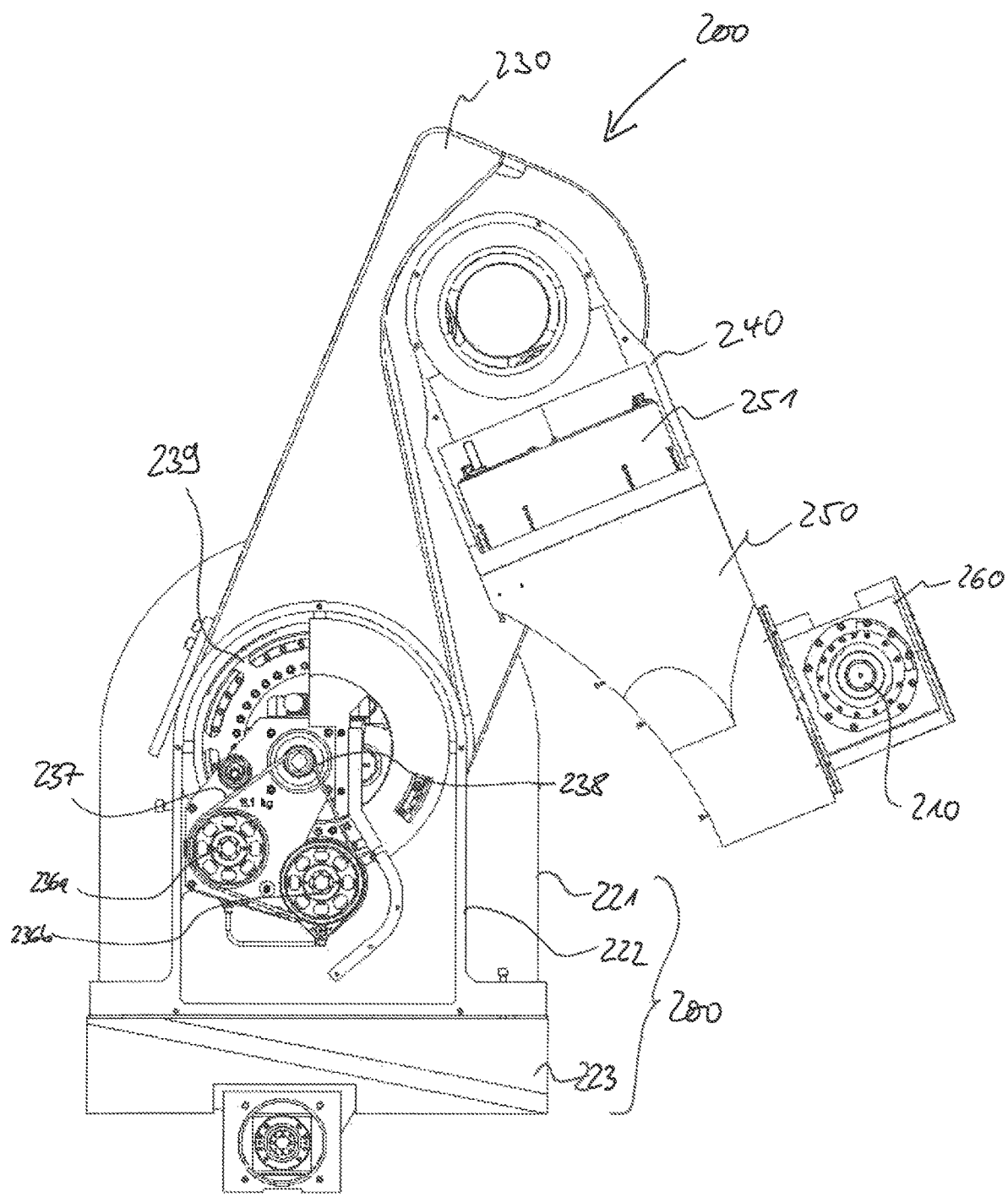
FIG. 16 shows an exemplary left-hand side view of the spindle carrier assembly according to FIG. 11.

FIG. 11 shows an exemplary perspective view of a spindle carrier assembly of the machine tool of FIGS. 1 to 10 according to an embodiment of the invention. However, it can also be used in any number on other machine tools, machine frames, machine beds and machine columns. FIGS. 12 to 14 show further perspective views of a spindle carrier assembly according to FIG. 11, FIG. 15 shows an exemplary right-hand side view of the spindle carrier assembly according to FIG. 11, and FIG. 16 shows an exemplary left-hand side view of the spindle carrier assembly according to FIG. 11.

The spindle carrier assembly 200 has a swivel arm receiving portion 220, which has two swivel arm support bodies 221 and 222 that are both arranged on a linear axis slide 223.

The linear axis slide 223 can be arranged on the linear guideways 160 of a machine frame 110 of the machine tool 100 in linearly movable fashion. The swivel arm support bodies 221 and 222 are arranged in the moving direction (e.g. X-direction) next to one another on the linear axis slide 223.

One end of a first swivel arm 230 is pivotally held between the swivel arm support bodies 221 and 222. The first swivel arm 230 is e.g. pivotally mounted about a first axis of rotation R1, which is e.g. aligned in parallel to the moving direction (e.g. X-direction) of the linear axis slide 223.

The other end of the first swivel arm 230 holds another second swivel arm 240, and the second swivel arm 240 is pivotally mounted on the first swivel arm 230 about a second axis of rotation R2. The first and second axes of rotation R1 and R2 are aligned e.g. parallel to each other.

The other end of the second swivel arm 240 holds a spindle carrier arm 250, which is rotatably mounted on the second swivel arm 240 about a third axis of rotation R3. The third axis of rotation R3 is aligned e.g. perpendicularly to the second axis of rotation R2.

The other end of the spindle carrier arm 250 holds a milling head 260, which is rotatably mounted on the spindle carrier arm 250 about a fourth axis of rotation R4. The fourth axis of rotation R4 is aligned e.g. perpendicularly to the third axis of rotation R3.

The milling head 260 comprises the above described work spindle 210 and a spindle drive (not shown) for driving the work spindle for the rotational driving of the received tool about the spindle axis SA in order to produce the cutting movement. The spindle axis SA is aligned e.g. perpendicularly to the fourth axis of rotation R4.

The milling head can freely travel or be moved with precision in a plane by swiveling the first and second swivel arms 230 and 240, said plane being aligned perpendicularly to the moving direction (e.g. X-direction) of the linear axis slide 223.

This renders possible a freer movement with fewer components, which replaces two linear axes perpendicularly to the moving direction (e.g. X-direction) of the linear axis slide 223 and thus renders possible a greater freedom of movement at equal degrees of freedom in the working area.

In addition, the rotary motions about the axes of rotation R3 and R4 render possible a free alignment of the spindle axis in all three directions in space in order to process a workpiece from any direction.

Therefore, this makes possible a freer movement with fewer components and freer processing area with a greater freedom of movement in the working area at the same degrees of freedom which a five-axis milling machine of conventional design has. Highly rigid assemblies having high-precision drives and swivel and/or rotary axes can simultaneously be provided so as to achieve the same or even better processing accuracies, as is the case for five-axis milling machines of conventional design (travelling column milling machine).

Examples and embodiments of the present invention and the advantages thereof are described in detail above with reference to the enclosed drawings. However, it is pointed out again that the present invention is by no means limited or confined to the above described embodiments and the design features thereof but comprises further modifications of the embodiments, in particular those which are comprised by modifications of the features of the described examples and/or by combination of one or more of the features of the described examples on the basis of the scope of protection of the independent claims.

In summary, the present invention renders possible to create or provide a machine tool concept which has a machine kinematics with highly rigid components and at the same time has a high motion flexibility with high degrees of freedom and a high processing accuracy and/or control precision and in addition renders possible an efficient, precise and simple workpiece processing, in particular for carrying out milling work on small and large workpieces made of a composite material, in particular a carbon fiber-reinforced plastic material or CFK, on freeform surfaces.

In particular, it is thus possible to provide a machine tool concept which renders possible more flexible and at the same time accurate processing operations at high quantities when the milling work is carried out on workpieces made of a composite material, in particular a carbon fiber-reinforced plastic material or CFK. A machine concept is provided which renders possible a high processing motion flexibility creating high degrees of freedom, high rigidity and high processing accuracy as well as efficiency.

The invention claimed is:

1. A machine tool for machining a workpiece, comprising:
a machine bed,
a workpiece clamping portion, which is arranged on the machine bed and serves to clamp a workpiece on the machine tool,
a swivel arm receiving portion arranged on the machine bed,
a first swivel arm pivotally mounted on the swivel arm receiving portion about a first axis of rotation,
a second swivel arm pivotally mounted on the first swivel arm about a second axis of rotation,
a spindle carrier arm rotatably mounted on the second swivel arm about a third axis of rotation,
a milling head rotatably mounted on the spindle carrier arm about a fourth axis of rotation, and
a tool spindle which is held on the milling head and serves to receive a tool, wherein the third axis of rotation is aligned perpendicularly or transversely to the fourth axis of rotation,
the swivel arm receiving portion has two swivel arm support bodies, and
the first swivel arm is held so as to be pivotally mounted between the two swivel arm support bodies, wherein
one of the swivel arm support bodies is smaller than the other swivel arm support body of the two swivel arm support bodies.

2. The machine tool according to claim 1, wherein the second axis of rotation is aligned parallel to the first axis of rotation.

3. The machine tool according to claim 1, wherein the third axis of rotation is aligned perpendicularly or transversely to the second axis of rotation.

4. The machine tool according to claim 1, wherein a spindle axis of the tool spindle is aligned perpendicularly or transversely to the fourth axis of rotation.

5. The machine tool according to claim 1, wherein the workpiece clamping portion is linearly movable relative to the swivel arm receiving portion on the machine bed in at least one linear axis direction.

6. The machine tool according to claim 1, wherein the swivel arm receiving portion is arranged on an axis slide which is linearly movable on the machine bed.

7. The machine tool according to claim 6, wherein the axis slide is linearly movable in a direction aligned parallel to the first axis of rotation.

8. The machine tool according to claim 1, wherein the second swivel arm is held on the side of the first swivel arm that faces the smaller swivel arm support body.

9. The machine tool according to claim 1, wherein each of the two swivel arm support bodies of the swivel arm receiving portion has at least one drive for driving a swivel movement of the first swivel arm.

10. The machine tool according to claim 1, wherein each of the two swivel arm support bodies of the swivel arm receiving portion has at least one clamped transmission for transmitting a torque while driving a swivel movement of the first swivel arm.

11. The machine tool according to claim 1, wherein the first swivel arm has at least one drive for driving a swivel movement of the second swivel arm.

12. The machine tool according to claim 1, wherein the first swivel arm has at least one clamped transmission for transmitting a torque while driving a swivel movement of the second swivel arm.

13. The machine tool according to claim 10, wherein each of the clamped transmissions has at least one driven drive element and at least two driving drive elements, which simultaneously work together with the driven drive element.

14. The machine tool according to claim 1, wherein the second swivel arm has at least one drive for driving a rotary motion of the spindle carrier arm.

15. The machine tool according to claim 14, wherein the drive for driving the rotary motion of the spindle carrier arm is made as a torque drive.

16. The machine tool according to claim 1, wherein the spindle carrier arm has at least one drive for driving a rotary motion of the milling head.

17. The machine tool according to claim 16, wherein the drive for driving the rotary motion of the milling head is made as a torque drive.

18. The machine tool according to claim 1, comprising a tool magazine for storing a plurality of tools for inserting and/or exchanging tools on the tool spindle.

19. The machine tool according to claim 1, comprising
in addition to a first spindle carrier assembly, which comprises the swivel arm receiving portion, the first swivel arm, the second swivel arm, the spindle carrier arm, the milling head and the tool spindle, a second spindle carrier assembly is arranged on the machine bed.

20. The machine tool according to claim 19, wherein the second spindle carrier assembly comprises:
a second swivel arm receiving portion arranged on a machine bed of the machine tool,
a third swivel arm pivotally mounted on the second swivel arm receiving portion about a fifth axis of rotation,
a fourth swivel arm pivotally mounted on the third swivel arm about a sixth axis of rotation,
a second spindle carrier arm rotatably mounted on the fourth swivel arm about a seventh axis of rotation,
a second milling head rotatably mounted on the second spindle carrier arm about an eighth axis of rotation, and
a second tool spindle which is held on the second milling head and serves to receive a tool,
wherein the seventh axis of rotation is aligned perpendicularly or transversely to the eighth axis of rotation.

21. The machine tool according to claim 20, wherein the first, second, fifth and sixth axes of rotation are all aligned parallel to one another, wherein the first and fifth axes of rotation are aligned coaxially to one another.

22. The machine tool according to claim 20, wherein the first and second spindle carrier assemblies are arranged in the direction of the first and/or fifth axis of rotation next to one another on the machine bed.

23. A spindle carrier assembly for use on a machine tool, comprising
a swivel arm receiving portion that can be arranged or mounted on the machine bed of the machine tool,
a first swivel arm which is pivotally mounted on the swivel arm receiving portion about a first axis of rotation, a second swivel arm which is pivotally mounted on the first swivel arm about a second axis of rotation, a spindle carrier arm which is rotatably mounted on the second swivel arm about a third axis of rotation, a milling head which is rotatably mounted on the spindle carrier arm about a fourth axis of rotation, and a tool spindle which is held on the milling head and serves to receive a tool, wherein the third axis of rotation is aligned perpendicularly or transversely to the fourth axis of rotation the swivel arm receiving portion has two swivel arm support bodies, and the first swivel arm is held so as to be pivotally mounted between the two swivel arm support bodies, wherein one of the swivel arm support bodies is smaller than the other swivel arm support body of the two swivel arm support bodies.

* * * * *